Dec. 3, 1968　　　F. CALABRESE　　　3,414,145
SHIP HOLD STRUCTURE FOR LOADING OF PALLETIZED CARGO
Filed June 21, 1967　　　　　　　　　　　　　　4 Sheets-Sheet 1

INVENTOR.
FRANK CALABRESE
BY
*Edward F. Levy*
ATTORNEY

Dec. 3, 1968     F. CALABRESE     3,414,145

SHIP HOLD STRUCTURE FOR LOADING OF PALLETIZED CARGO

Filed June 21, 1967     4 Sheets-Sheet 2

INVENTOR.
FRANK CALABRESE
BY
*Edward F. Levy*
ATTORNEY

INVENTOR.
FRANK CALABRESE

Dec. 3, 1968   F. CALABRESE   3,414,145
SHIP HOLD STRUCTURE FOR LOADING OF PALLETIZED CARGO
Filed June 21, 1967   4 Sheets-Sheet 4

INVENTOR.
FRANK CALABRESE
BY
Edward F. Levy
ATTORNEY

United States Patent Office 3,414,145
Patented Dec. 3, 1968

3,414,145
SHIP HOLD STRUCTURE FOR LOADING
OF PALLETIZED CARGO
Frank Calabrese, 4828 194th St.,
Flushing, N.Y. 11365
Filed June 21, 1967, Ser. No. 647,770
10 Claims. (Cl. 214—15)

ABSTRACT OF THE DISCLOSURE

Apparatus for loading cargo mounted on pallets within hold compartments of a multi-deck ship in which the decks have vertically-aligned hatch openings. A plurality of pontoons are provided to fill the deck hatch openings and a trestle is mounted on the main deck for storing the pontoons and for mounting cables selectively attachable to individual pontoons for raising and lowering the pontoons loaded with cargo between the main deck and the various sub-deck levels. Retractable latch means are provided at each deck level for supporting the pontoons during loading operations.

---

Conventional procedures for the loading of cargo into ships have always been peculiarly inefficient, presenting problems in utilizing optimum storage space, balancing the load, grouping cargoes with respect to different ports, shoring movable cargo, positioning the cargo properly, shifting operations to various deck levels and transporting the cargo into and out of the available hold space. Consequently, in loading a ship, maximum storage space is not utilized and considerable handling and manual operations are required, resulting in constantly increasing cost.

To reduce the aforementioned problems, it has been proposed to pack the cargo in containers which can be conveniently stacked and stowed. The expense involved in supplying such containers, the necessity for returning them empty, and the additional problems inherent in their handling and loading, have made the use of such large containers questionable.

The loading and storage cargo mounted upon pallets of the conventional type used in other materials handling applications, would be ideal for ships, except that for transporting the palletized cargo fork lift trucks are required, and standard cargo ships are not built to permit use of such trucks efficiently.

It is an object of the present invention to provide a ship hold structure arranged to permit palletized loads to be moved vertically between the main deck level and the levels of various sub-decks, and to be stowed within compartments at the various decks utilizing conventional fork lift truck equipment.

Another object of the present invention is the provision of a ship hold structure of the character described, in which a vertical hatch provides access to the deck compartments of the hold, and in which a plurality of pontoons are employed to raise and lower palletized cargo and fork lift truck equipment as well as other loads such as vehicles, small containers, skids, machinery, etc., to and from the respective sub-decks, the pontoons being sized to cover over the respective hatch openings at each deck level when not in use for loading and unloading cargo.

A further object of the invention is the provision of a ship hold structure of the character described in which the aforementioned pontoons are raised and lowered in elevator fashion by a simple and economical cable arrangement, in such a manner that they may be used individually as required, and may be stored above deck level when not in use during loading or unloading operations.

In accordance with the invention herein, there is provided apparatus for loading palletized cargo in a ship having a main deck, a plurality of sub-decks, a multi-deck cargo hold surrounding a hatch. The apparatus includes a trestle on the main deck straddling the hatch opening and guiding a plurality of spaced cables vertically through the trestle and downwardly through the extent of the hatch. A plurality of pontoons are provided, one for each deck, each pontoon conforming in size and shape to the cross-sectional dimensions of said hatch. Means are provided for raising and lowering the cable for releasably securing the same to a selected pontoon, whereby each pontoon may be raised or lowered by said cables between a retracted and stored position within the trestle and an operative position at the level of one of said decks. Latch means are also provided in each deck for extension to a position in which it supports a pontoon in operative position flush with said deck and filling the hatch opening therein for the loading and unloading of palletized cargo by means of a fork lift truck. Latch means are also provided in the trestle for releasably holding the pontoons in stored condition, and a ventilating system is provided in the hold for circulating air automatically throughout the hold area at the deck level in which loading or unloading operations are being performed.

Additional objects and advantages of the invention will become apparent during the course of the following specification when taken in connection with the accompanying drawings, in which.

Figure 1:
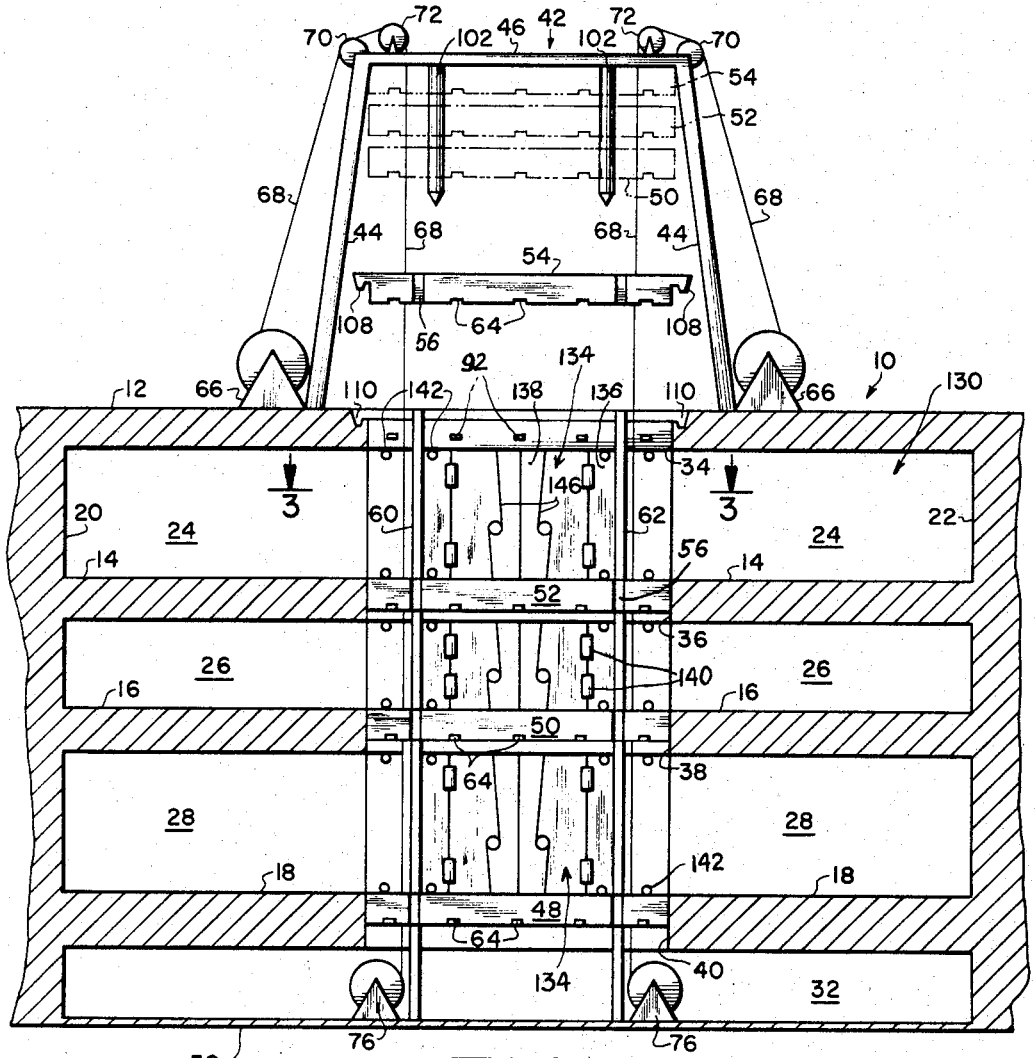
FIG. 1 is a vertical section taken longitudinally through a portion of a ship, showing the multi-deck hold, hatch structure and trestle arrangement of the present invention.
Figure 2:
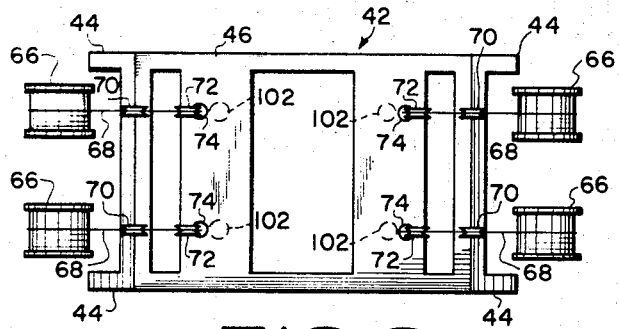
FIG. 2 is a top plan view of the trestle shown in FIG. 1.

Referring in detail to the drawings, there is shown in FIG. 1 a schematic cross-sectional representation of the interior portion of a ship represented generally by the reference numeral 10. The ship section illustrated constitutes a single hold for the stowing of cargo which may be loaded on pallets. In its preferred form, the ship 10 is a cargo ship especially constructed for the loading of cargo mounted on pallets, and for this purpose is divided along its length into a series of multi-deck holds of the type shown in FIG. 1. It is to be understood, however, that the hold arrangement and loading system of the invention may be applied to ships of various types, and that one or more holds of this type may be provided in a passenger ship, for example.

The ship 10 has a main deck 12, and therebeneath a shelter deck 14, a tween deck 16 and a lower hold deck 18, extending respectively between bulkheads 20 and 22, and providing a multi-level hold divided into three stowage compartments 24, 26 and 28. Between the lower hold deck 18 and the shell 30 of the ship 10 is the double bottom 32.

The main deck 12 has a rectangular hatch opening 34, and the lower decks have corresponding hatch openings 36, 38 and 40 of the same size in registry with the hatch opening 34 to provide a continuous vertical hatch.

Mounted on the main deck 12 and straddling the hatch opening 34 is a trestle 42 comprising a plurality of upstanding legs 44 supporting an overhead structure 46. The trestle 42 is adapted to support a plurality of rectangular pontoons which fit within and cover over the respective hatch openings, there being a pontoon for each deck. In the illustrated embodiment, four pontoons 48, 50, 52 and 54 are provided. The pontoons are individually employed to lower cargo to the appropriate deck levels when loading the ship, to raise cargo to the main deck when unloading the ship, and to complete the flooring of the various levels during the loading and unloading operations, as well as while the ship is at sea. During loading and unloading operations, the pontoons not in use may be stored within the confines of the trestle 42, as indicated in phantom in FIG. 1.

Figure 3:
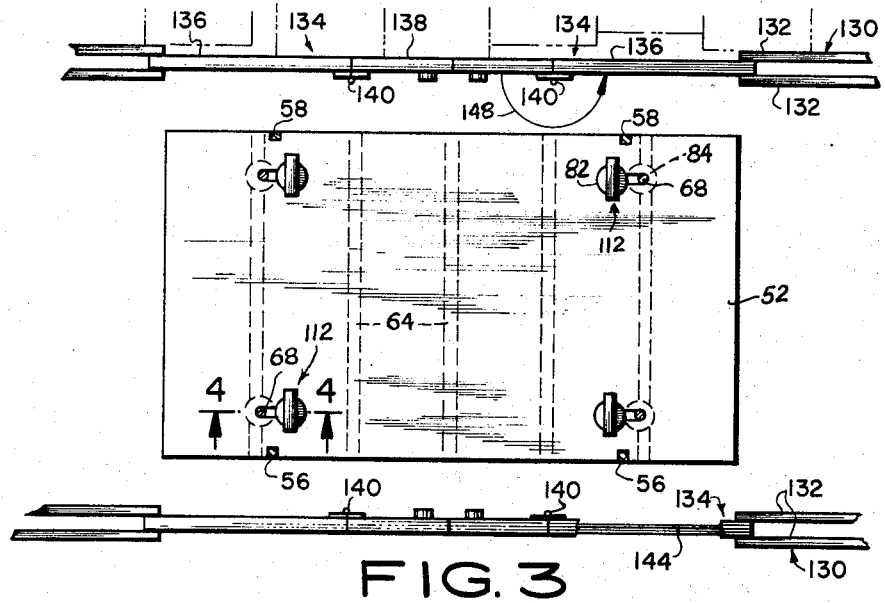
FIG. 3 is a section taken along line 3—3 of FIG. 1, and showing one of the pontoons thereof in mounted position within the hatch opening.

Each pontoon is in the form of a study, flat rectangular platform which may be reinforced on its under surface with a lattice of steel framework (not shown) to provide it with a rigid base. FIG. 3 shows the pontoon 52 in plan view, and the following description thereof will apply equally to the other pontoons. At the opposite sides of the pontoon 52 are formed pairs of spaced rectangular recesses 56 and 58 which receive corresponding pairs of guide rails 60 and 62 mounted within the ship at the sides of the hatch and extending vertically from the main deck 12 to the shell 30. The bottom surface of the pontoon 54 is also formed with a series of spaced, parallel rectangular slots 64 extending transversely thereacross and adapted to receive corresponding support latches which hold the pontoon within the hatch opening of a respective deck, in a manner to be presently described.

Hoisting means are provided for raising and lowering the pontoons individually between their operative positions and stored position. Such hoisting means include four powerdriven winches 66 upon which are wound respective cables 68. Each cable 68 is trained over a pair of guide sheaves 70 and 72 mounted on the trestle 42 and extends through an opening 74 in the trestle overhead structure 46, and thence downwardly through all of the hatch openings to a respective tension winch 76 secured in the double bottom 32 of the ship. Each of the four cables 68 has a frusto-conical key 78 secured thereto.

The winches 66 and 76 are of conventional type, and are driven simultaneously and in synchronization in such a manner that as the cable is unwound from one winch 66, it is wound upon the corresponding winch 76, and vice versa. Thus, each winch 76 serves as a take-up and tension winch to keep its connected cable 68 taut at all times. It will be appreciated that as the cables 68 are wound upon or unwound from the winches 66, the keys 78 secured to the respective cables, are simultaneously raised or lowered through the hatch.

Figure 7:
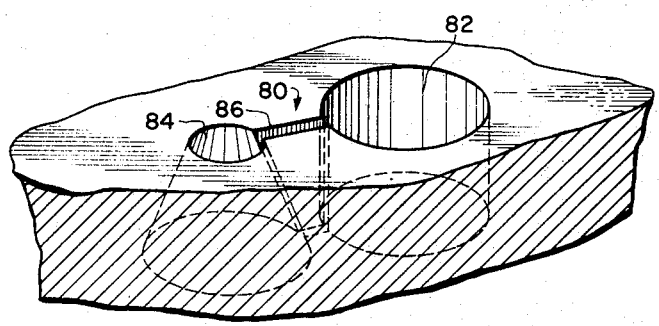
FIG. 7 is an enlarged perspective view of one of the keyhole slots located at each corner of the respective pontoons.

Each of the pontoons 48, 50, 52 and 54 have adjacent its corners, four respective keyhole slots 80 which provide means for selectively coupling and uncoupling the keys 78 with the respective pontoons. These keyhole slots 80 are shown in detail in FIGS. 4 and 7, and each comprises a through cylindrical bore 82 communicating with a frustro-conical seat 84 through a narrow rectangular passageway 86. The cylindrical bores 82 are sized to permit free passage of the keys 78 therethrough, while the seats 84 correspond in size and shape with the keys, being thus adapted to receive the keys snugly therein.

Figure 4:
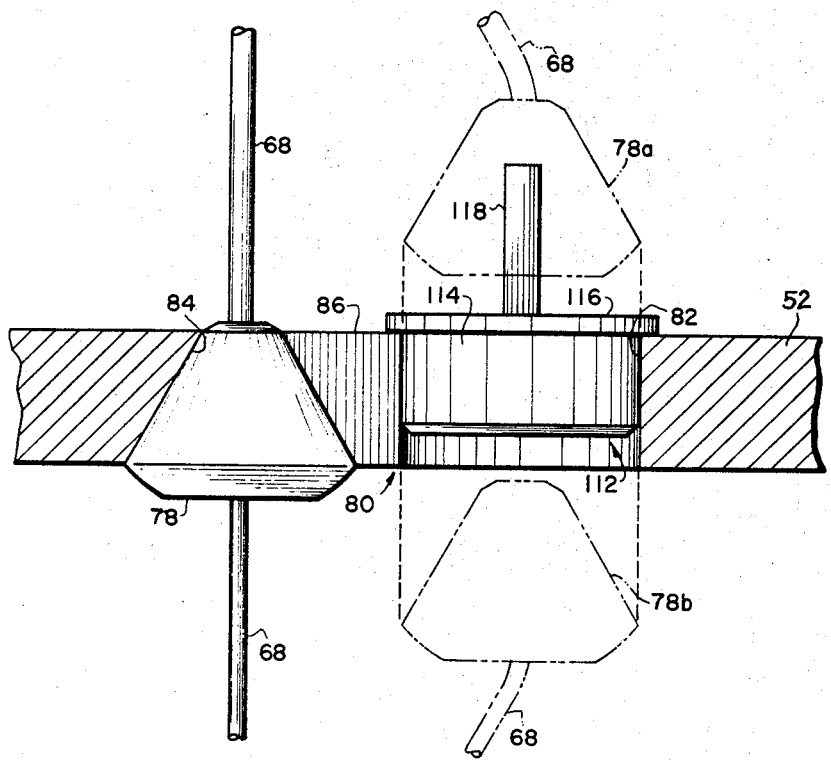
FIG. 4 is an enlarged section taken along line 4—4 of FIG. 3.

As previously indicated, the keys 78 are of frusto-conical shape and are secured in inverted position upon the respective cables 68. The cables 68 are normally guided in such a vertical path that they pass freely through the aligned frusto-conical seat openings 84 of the keyhole slots 80 in each pontoon. For the purpose of lifting or lowering a pontoon, each of the four cables 68 is coupled to a corner thereof by means of the respective keys 78. FIG. 4 illustrates the manner in which such coupling is accomplished with respect to the pontoon 52. Assuming that the key 78 is located above the pontoon, the cable 68 is lowered to bring the key 78 to the position shown at 78a in FIG. 4, wherein said key is directly above the cylindrical bore 82. The cable is then further lowered a short distance until the key passes through the bore 82 and is located immediately beneath, in the position indicated at 78b in FIG. 4. Some slack is then taken in the cable 68 from above and the key is pulled manually in a transverse direction until it is located beneath the frusto-conical seat 84. During this movement of the key 78, the cable 68 above the key slides through the rectangular passageway 86 to the center of seat 84. The cable 68 is now raised, lifting the key 78 to the position shown in full line in FIG. 4, in which the key is snugly and securely seated in the frusto-conical seat 84. As long as tension is now maintained on the cable through winches 66, the key 78 is secured within the seat.

The above procedure is simultaneously performed with the other cables, so that a key is locked within the appropriate seat of the keyhole slot at each corner of the pontoon. The pontoon is now effectively secured to all four cables 68, and may be lifted or lowered by selective operation of all winches simultaneously. After the pontoon is raised or lowered to a supported position, the keys can be uncoupled therefrom by reversing the procedure. The cables are lowered slightly to move the keys out of the seats and position them below the pontoon. The keys are then moved manually to locate them below the cylindrical bores 82, and the cable is raised to lift the keys through the respective bores and away from the supported pontoon.

Figure 5:
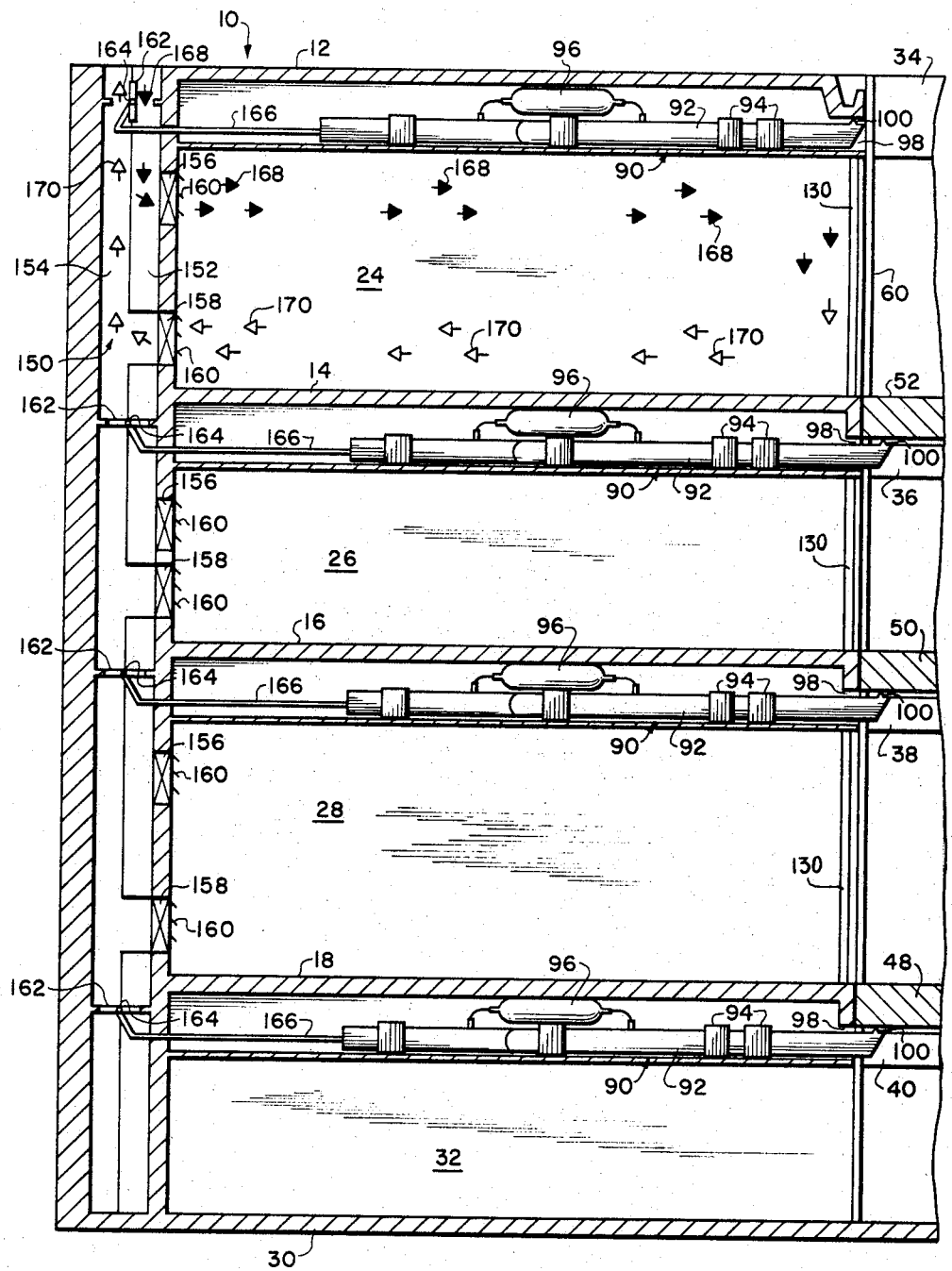
FIG. 5 is a vertical section taken transversely of the ship, showing the hold area on one side of the hatch and the latch and air ventilation system incorporated therein.

Latch assemblies 90 are provided at each deck level for supporting a pontooon in mounted position at that level. As shown in FIGS. 1 and 5, each latch assembly 90 comprises a plurality of latch members 92 in the form of sturdy elongated bars slidably mounted within the interior of the respective deck by straps 94 for movement between a nested position in which they are located wholly within the deck interior, and an extended position in which they project within the hatch opening. A pair of latch assemblies 90 are located at each deck level, on opposite sides of the hatch openings. In the preferred form shown in FIGS. 1 and 3, each latch assembly consists of five spaced latch members 92 which are interconnected to slide together between the nested and extended positions.

The latch assemblies 90 may be actuated by manual, hydraulic or electric means. In the preferred embodiment illustrated herein, hydraulic means are illustrated, in the nature of hydraulic cylinders 96 mounted within the interiors of the various decks. Each cylinder 96, as shown schematically in FIG. 5, is coupled to the latch members 92 of the respective latch assembly in such a manner that it may be selectively operated to slide the latch members inwardly to nested position, or slide the latch members outwardly to extended position.

Figure 6:
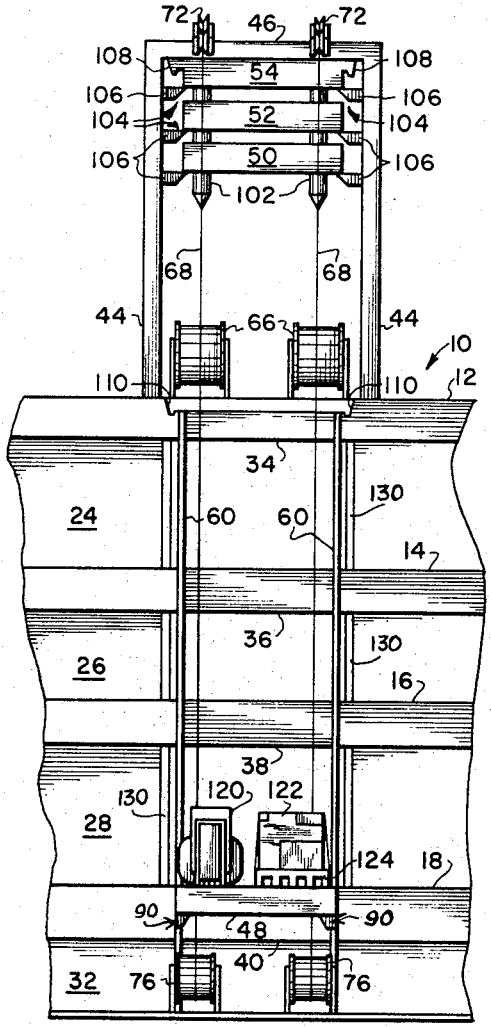
FIG. 6 is a partial vertical transverse section similar to FIG. 5 but on a reduced scale and showing the hold area on both sides of the hatch and the trestle arrangement thereabove.

In FIG. 5, the uppermost latch members 92 within the main deck 12 are shown in nested position, wholly within the confines of the deck structure, so that the hatch opening 34 at the main deck is unobstructed for passage of the pontoons therethrough. On the other hand, the latch members 92 within the shelter deck 14, tween deck 16 and lower hold deck 18 are in extended position, with their end portions projecting through respective openings 98 in the hatch combing. In this extended position, the projecting end portions of the latch members underlie the pontoons 48, 50 and 52, fitting within the pontoon slots 64 to support one side of said pontoons. As shown in FIG. 6, the latch assemblies 90 are provided at opposite sides of the hatch, so that each pontoon is supported at both sides by an assembly of five latch members. At any deck level, the latch assemblies 90 at both sides of the hatch opening are operated simultaneously so that when a pontoon is lowered to that leck level, it will be securely supported at both sides thereof.

It will be observed in FIG. 5 that the latch members 92 are arranged to support the various pontoons in mounted positions in which their upper surfaces are flush with the upper surfaces of the respective decks to act as continuations thereof, and with the mounted pontoons filling the hatch openings at the respective decks. The end portions of the latch members may be toothed, as shown at 100 in FIG. 5 to engage corresponding notches in the under surface of the pontoons and thereby secure the latter from any lateral movement.

Mounted on the under surface of the trestle overhead structure 46 are four depending pins 102 having tapered ends. During loading and unloading operations, when it is desired to clear the hatch, the pontoons not in use are hoisted to the upper portion of the trestle 42, where they are held in stored condition. As the cables 68 are used to raise the pontoons individually into the interior of trestle 42, the pontoons are received on the pins 102, in the manner indicated in phantom in FIG. 1. The pins 102 are sized and positioned to be received in the circular bores 82 of the respective keyhole slots 80 of each pontoon, and serve to align the stored pontoons and restrict movement thereof. The trestle 42 is also provided with latch assemblies 104 for releasably locking the pontoons in stored position within the trestle. As shown in FIG. 6, these latch assemblies are similar to the deck latch assemblies 90 previously described, each comprising two horizontally-spaced latch members 106 slidably mounted in the upper trestle structure at the sides of the trestle for movement between a retracted, nested position and an extended position. When a pontoon is elevated to the level of a latch assembly 104 and the latch members 106 thereof are extended, they underlie the pontoon and extend within its end bottom recesses 56, supporting the pontoon in its stored position within the trestle. The latch assemblies 104 may be operated by hydraulic means similar to that employed for the deck latch assemblies previously described, or may be operated manually or electrically.

When the ship is at sea, all four pontoons 48, 50, 52 and 54 are supported at the various deck levels by the respective hatch openings and provide unbroken deck surfaces. It will be observed that the pontoon 54 is especially constructed to close off the hatch opening 34 of the main deck 12, and is provided with a projecting peripheral flange 108 which fits within a corresponding recessed portion 110 of the main deck bordering the hatch opening 34, so that when the pontoon 54 is lowered into supported position within the hatch opening, its upper surface is flush with the surface of the main deck and the flange 108 provides a weather tight seal for the hatch. The supported pontoon is further sealed by retaining all of the keys 78 in seated position within the frusto-conical seats 84, thereby preventing moisture from passing through the latter. In addition, each of the four cylindrical bores 82 of the keyhole slots 80 may be filled with a closure plug. This plug may be of any type, for example, it may be in the form of the plug 112 shown in FIGS. 3 and 4 in conjunction wtih pallets 52. Plug 112 comprises a cylindrical body 114 sized to fit frictionally and firmly within the respective bore 82, and a top flange 116 which overlies said bore and provides a water-tight seal thereabout. Upstanding from the flange 116 is a metal bar 118 which is used for insertion and removal of the plug, and also serves to protect the adjacent cable from damage due to contact by the loads or by the fork truck employed for transporting the loads. Additional plugs may also be employed for insertion into the pontoons supported at the lower deck levels during loading operations.

The structure heretofore described may be employed in the loading of cargo upon the ship in a typical sequence of operation as follows: Assuming that the lowermost compartment 28 is to be loaded first, the pontoons 54, 52, and 50 are elevated and stored within the trestle 42, in the manner shown in FIG. 6 and in broken line in FIG. 1. This is accomplished by lowering the cables 68 and engaging all four keys 78 with the respective frusto-conical seats 84 at the corners of the pontoon 54, and then operating the winches to hoist the pontoon 54 to its stored position, wherein it is held by the trestle latch members 106. The latch members 92 in the main deck 12 are now retracted to nested position, the keys 78 are disengaged from the stored pontoon 54, and the cables 68 are lowered to move the keys 78 through the cylindrical bores 82 of the next pontoon 52. When the keys 78 are located beneath the pontoon 52, they are engaged with the frusto-conical seats 84 therein, and the winches are operated to raise the pontoon 52 to its stored position within the trestle 42. The same process is repeated with the pontoon 50.

The cable keys 78 are now engaged with the lowermost pontoon 48 at the level of the lower hold deck 18, and the pontoon 48 is elevated until it is flush with the main deck 12. The latch members 92 of the main deck 12 may be extended to support the pontoon 48 at this position, as a safety factor, although this should not be necessary since the pontoon 48 is supported by the keys 78 and cables 68. A fork truck is first lowered by the pontoon 48 to the compartment 28 and the pontoon returned to the main deck. Cargo mounted upon pallets is now lifted from the main deck by other fork lift trucks of the well-known type, driven to the supported pontoon and deposited thereon. When the pontoon is loaded with such palletized cargo, it is lowered by cables 68 to the lower hold deck 18. FIG. 6 shows the loaded pallet 48 after it has reached the level of lower hold deck 18 and is supported by the latch members 92 thereof. The pontoon 48 is shown carrying cargo 122 mounted on pallets 124, and the previously lowered fork truck 120 has been driven onto the pontoon and employed to lift the pallets 124 and load them and the mounted cargo within the stowage compartment 28. After the cargo is deposited, the pontoon 48 is raised to main deck level where the trucks at deck level stow further cargo thereon. The operation is repeated until the compartment 28 has received a full or selected partial load of cargo.

Pontoon 48 is now used to lift fork truck 120 to the level of lower hold deck 18 and deposit it thereon, and is then hoisted to the main deck, loaded with additional palletized cargo, and brought down to the level of the lower hold deck 18 where it is supported by the extended latch assemblies 90 at that level, and the fork truck 120 is again employed to stow cargo within the compartment 26. When the latter is filled to the desired capacity, the fork truck 120 is lifted to the level of shelter deck 14 and the pontoon 48 is operated at that level to fill the compartment 24.

In the event that it is desired to load the lower hold deck 18 to full capacity, after the compartment 28 is completely filled, the pontoon 48 is loaded with cargo, lowered to supported position at lower hold deck 18, and left in this position supported by the latch assemblies. The stored pontoon 50 is now employed to load the next compartment 26. The pontoon 50 is engaged by the cable keys 78, lowered to the main deck for loading, and then lowered to the tween deck 16. In the same manner, pontoon 52 may be employed for loading the shelter deck 14. However, the preferred procedure is to keep the hatch area clear of stored cargo and to employ only the pontoon 48 for successive loading of each compartment, as previously described.

After all decks are loaded, the pontoon 50 is engaged by the cable keys and lowered to the tween deck 16, the latch assemblies being extended to mount it in final position covering over the hatch opening 38. The pontoon 52 is similarly lowered and mounted within hatch opening 36 of shelter deck 14, and finally the pontoon 54 is lowered to cover over and seal off the main deck hatch opening 34.

As shown in FIGS. 1, 3, 5 and 6, the ship hold is rigidly reinforced by compartment bulkheads 130 which extend vertically between the decks. These bulkheads 130 are aligned with and parallel to the port and starboard sides of the hatch openings at each deck level, and each begins at one of the end bulkheads 20 or 22 of the storage compartment and terminates flush with the fore or aft end of the hatch opening. As shown in FIG. 3, each compartment bulkhead 130 is a double bulkhead formed of a pair of walls 132 which are spaced apart to provide a storage area therebetween for double and folding sliding doors 134.

The compartment bulkheads 130 rigidly reinforce the multi-level hold areas at the various deck levels, particularly in the vicinity of the hatch openings. They also provide rigid surfaces against which cargo can be stacked, and prevent the cargo from shifting when the ship is at sea.

Each of the double folding doors 134 comprises a main section 136 and a folding section 138 connected thereto by hinges 140. The main door section 136 is mounted on wheels or rollers 142 which ride in a slotted track 144 extending along the hatch opening, so that the main door section 136 may be slid from a stored position within the walls of the double bulkhead 130 to an extended position along the hatch opening. As shown in FIG. 1, the folding door section 138 is of lesser height than the main door section 136 so that it is freely carried by the main door section 136 when the latter is slid along the track 144, and so that it may be folded upon the hinges 140 to a position in which it rests flat upon the main door section.

During loading operation, the double sliding doors 134 are slid into the interiors of the respective bulkheads 130. After a compartment is fully loaded, the sliding doors are slid out of the bulkheads until both sliding doors at one side of the hatch opening are extended and abut each other at the center of the hatch opening, as shown in FIGS. 1 and 3. In this extended position, the doors cover over one side of the hatch opening, preventing palletized cargo from sliding into the hatch, in addition to preventing pilferage of the cargo.

To hold the sliding doors in extended position, the folding door sections 138 are provided with latches 146 accessible from the hatch opening, as shown in FIG. 1.

The folding door sections 138 are provided on the sliding doors to enable the doors to be opened even if cargo shifts and slides against the doors. If the hatch doors were only slidable, displaced cargo leaning thereagainst would make the doors difficult or impossible to open. It will be noted, however, that in the present instance, the folding door sections 138 swing inwardly from closed position toward the hatch, as indicated by the arrow 148 in FIG. 3. Thus, even if shifted cargo, resting against the compartment doors, obstructs the sliding of said doors, the operator standing on the pontoon at the level of the obstructed doors can open the latches on the folding door sections 138 and swing them inwardly about the hinges 140. The operator may then enter the cargo compartment with the fork truck through the open doors and clear away the shifted cargo so that the doors may be slid to retracted position for unloading the cargo.

Since the arrangement described contemplates the use of fork lift trucks for conveying palletized cargo into and out of the stowage compartments at each of the deck levels, a ventilation system is provided for clearing the deck levels of dangerous carbon monoxide fumes emitted by the gasoline engines which conventionally drive such lift trucks. This ventilation system includes enclosed ducts 150 extending the height of the ship along the sides thereof, with a duct 150 located at each side of the compartments bordering a hatch. FIG. 5 shows one of the ducts 150 at one side of the compartments.

Each duct 150 is divided vertically into an air inlet conduit 152 and an air outlet conduit 154, both of which conduits extend vertically from the bottom of the ship and open at the main deck thereof. Power driven blower means (not shown) on the main deck supplies a current of air downwardly into the inlet conduit 152.

At each deck level there is provided in the framing at intervals in the stowage compartment louvred air inlet openings 156 and louvred air exhaust openings 158. The air inlet openings 156 communicate with the inlet conduit 152, while the exhaust opening 158 communicates with the air outlet conduit 154. The openings 156 and 158 are both provided with louvres 160 of the shutter type which may be closed to seal off the respective openings.

At the level of each deck 12, 14, 16 and 18, a shutter member 162 is pivotally mounted within duct 150 as indicated at 164 for movement between a horizontally-disposed position in which it extends across and shuts off both conduits 152 and 154 from the passage of air at that level, and a vertically-disposed position in which it opens the ducts to the passage of air therethrough. The shutter member 162 at each level is operatively coupled to the latch assembly 90 at that level, in such a manner that when the latch members 92 are in retracted or nested position, the shutter member 162 is open, and when the latch members are extended to support a pontoon, the shutter member is closed. FIG. 5 shows a coupling member 166, in the nature of a lever arrangement, connecting each shutter member 162 with a respective latch assembly 90.

The coupling members 166 at the shelter deck 14, tween deck 16 and lower hold deck 18 are also operatively connected to the louvres 160 of both the air inlet opening 156 and air exhaust opening 158 for the respective deck, in such a manner that when the latch assemblies 90 are retracted, the louvres are closed, and when the latch assemblies are extended, the louvres are opened.

The ventilation system is so arranged that air is circulated through only the stowage compartment in which loading or unloading operations are being performed. Thus, when cargo is to be brought to or unloaded from a particular compartment, the latch assemblies at the deck level of said compartment are extended to support the pontoon, thus closing the shutter within duct 150 to the passage of air below said deck level and opening the louvred openings for said compartment. At the same time, the latch assemblies above the designated compartment are retracted to permit passage of the pontoon through the hatch, so that the louvred openings in the compartments above the particular compartment are closed and air circulated through the duct 150 is directed to the compartment in which the fork truck is operating.

FIG. 5 shows the condition in which the upper stowage compartment 24 is being loaded, utilizing pontoon 52, which is supported by the extended latch members 92 of the shelter deck 14. Since the latch assembly 90 of the shelter deck 14 is extended for loading at this level, the shutter member 162 at the shelter deck is closed, while the louvred air inlet opening 156 and air exhaust opening 158, communicating with the compartment 24, are open. To permit pontoon passage during loading, the latch assembly 90 in the main deck 12 is retracted, so that the shutter member 162 at the level of the main deck is open. A current of air introduced at the main deck into the conduit 152 therefore travels in the direction of the arrows 168 in FIG. 5, entering compartment 24 through the inlet opening 156 and leaving in the direction of arrows 170 through the exhaust opening 158, and up conduit 154 to the atmosphere at the main deck. Since the shutter member 162 at the level of shelter deck 14 is closed, the current of circulated air is efficiently restricted to the compartment 24 to clear the same of engine exhaust fumes resulting from the loading operation.

While a preferred embodiment of the invention has been shown and described herein, it is obvious that numerous omissions, changes and additions may be made in such

What is claimed is:

1. Apparatus for the loading and unloading of palletized cargo within a ship having a main deck and a plurality of sub-decks, a hatch, and multi-level hold area bordering said hatch; said apparatus comprising a trestle mounted on said main deck above the opening of said hatch, a plurality of cables extending through said trestle and vertically throughout the height of said hatch, means for simultaneously raising and lowering said cables, a plurality of pontoons each conforming in size and shape to the cross-sectional dimensions of said hatch, coupling means for releasably securing each of said pontoons individually to said cables for raising and lowering of said pontoons from a mounted and stored position within said trestle above the level of the main deck to an operative position in alignment with the level of a selected deck wherein said pontoon fills the hatch opening in said deck and serves as a continuation of the latter, and latch means within each deck movable from a retracted position to an extended position in which it supports a pontoon in operative position.

2. Apparatus according to claim 1 in which said coupling means comprises a key affixed to each of said cables and a plurality of keyhole slots in each of said pallets, each of said cables extending through a respective keyhole slot of each pallet, each keyhole slot comprising an enlarged through bore sized to permit the key of the respective cable to pass freely therethrough, a spaced through bore of size and shape corresponding to the size and shape of said key and adapted to form a seat therefor, and a narrow slot connecting said bores and sized to permit transverse movement of the respective cable therethrough.

3. Apparatus according to claim 2 in which each of said keys is of frusto-conical shape, each of said enlarged through bores is cylindrical, and each of said seats has frusto-conical contour.

4. Apparatus according to claim 2 in which each of said pontoons are rectangular, and in which a keyhole slot is located in each corner of each pontoon.

5. Apparatus according to claim 1 in which said latch means comprises a latch assembly slidably mounted within each deck at opposite sides of said hatch, each latch assembly comprising a plurality of elongated latch bars, and means for moving the opposed latch assemblies of a selected deck simultaneously between a nested position in which the latch bars are located within the interior of the deck and are clear of the hatch opening therein, and an extended position in which the latch bars project within said hatch opening and underlie and support a pontoon brought to the level of said selected deck.

6. Apparatus according to claim 2 in which said trestle comprises a plurality of upright legs and a top transverse member supported by said legs and spaced above the hatch opening of said main deck, a plurality of depending pins mounted on said transverse member and sized and positioned to receive the respective enlarged through bores of the pontoons raised to stored position within the trestle, and latch means mounted on said trestle for releasably holding said pontoons in stored position therein.

7. Apparatus according to claim 1 in which the means for simultaneously raising and lowering said cables comprises a plurality of winches mounted on said main deck adjacent said trestle, each winch being operatively coupled to a respective cable, and means guiding said cables from said winches through said trestle and vertically through said hatch.

8. Apparatus according to claim 1 in which a pair of sliding doors are mounted at each sub-deck on opposite sides of said hatch, said pair of doors being slidable between a closed position in which they extend across the hatch and an open position in which they are clear of said hatch, each sliding door comprising a main section slidably mounted on the respective sub-deck and a folding section hinged to said main section for pivoting movement thereon in the direction of said hatch.

9. Apparatus according to claim 1 which also includes a ventilating system for circulating air automatically through the hold area at which the loading and unloading operations are being performed, said ventilation system comprising an enclosed air inlet conduit and an air outlet conduit both extending vertically from the main deck to the hold area at the level of the lowermost sub-deck, said air inlet conduit and air outlet conduit each communicating with the hold areas of each of the sub-decks through respective air inlet openings and air outlet openings, a shutter assembly at each deck level movable from an open position allowing passage of air through said conduits, and a closed position blocking both said conduits to the passage of air therethrough, means operatively coupling each shutter assembly to the latch means at the same deck level for opening said shutter assembly when the latch means is retracted and closing said shutter assembly when said latch means is extended.

10. Apparatus according to claim 9 in which each of said air inlet openings and air outlet openings has louvres for selectively opening and closing the same, said louvres being coupled to said latch means at the same deck level for closing said louvres when said latch means is retracted.

References Cited

FOREIGN PATENTS 831,990    4/1960    Great Britain.
1,199,824    6/1959    France.

GERALD M. FORLENZA, *Primary Examiner.*

F. E. WERNER, *Assistant Examiner.*